(12) United States Patent
Grushkevich

(10) Patent No.: US 8,310,964 B2
(45) Date of Patent: Nov. 13, 2012

(54) ENHANCED 2-WIRE AND 3-WIRE WLAN BLUETOOTH COEXISTENCE SOLUTION

(75) Inventor: Asif Grushkevich, LaJolla, CA (US)

(73) Assignee: Broadcom Corporation, Irvine, CA (US)

( * ) Notice: Subject to any disclaimer, the term of this patent is extended or adjusted under 35 U.S.C. 154(b) by 792 days.

(21) Appl. No.: 11/327,557

(22) Filed: Jan. 6, 2006

(65) Prior Publication Data

US 2007/0161349 A1 Jul. 12, 2007

(51) Int. Cl.
*H04B 7/00* (2006.01)
*H04W 4/00* (2009.01)

(52) U.S. Cl. .......................................... 370/310; 370/338

(58) Field of Classification Search .................. 370/310, 370/338, 328, 329; 455/411, 417, 418, 552.1
See application file for complete search history.

(56) References Cited

U.S. PATENT DOCUMENTS

2004/0151200 A1* 8/2004 Robertson ..................... 370/449

FOREIGN PATENT DOCUMENTS

| WO | 2004023747 B1 | | 3/2004 |
| WO | WO 2004/023747 | * | 3/2004 |
| WO | 2004045092 | | 5/2004 |
| WO | 2004045092 B1 | | 5/2004 |
| WO | 2005091563 B1 | | 9/2005 |
| WO | WO 2005/091563 | * | 9/2005 |

OTHER PUBLICATIONS

Chiasserini, C.F. et al; Coexistence mechanisms for interference mitigation between IEEE 802.11 WLANs and bluetooth; Proceedings IEEE Infocon 2002; The Conference on Computer Communications 21st Annual Joint Conference of the IEEE Computer and Communications Societies; New York, NY; Jun. 23-27, 2002; vol. 1 of 3. Conf 21; XP010593620.
Chiasserini, et al., "Coexistence Mechanisms for Interference Mitigation Between IEEE 802.11 WLANs and Bluetooth", IEEE Infocom 2002, pp. 590-598.

* cited by examiner

*Primary Examiner* — Michael Faragalla
(74) *Attorney, Agent, or Firm* — Thomas, Kayden, Horstemeyer & Risley, LLP

(57) ABSTRACT

Methods and systems for enhanced 2-wire and 3-wire WLAN Bluetooth coexistence solution may include determining whether adaptive frequency hopping is active in a Bluetooth communication device. If the adaptive frequency hopping is active, handshaking with a collocated non-Bluetooth communication device may be disabled. The collocated non-Bluetooth communication device may be a wireless local area network communication device. If the adaptive frequency hopping is inactive, handshaking with the collocated non-Bluetooth communication device may be enabled. If the adaptive frequency hopping is inactive, the Bluetooth communication device may initiate handshaking prior to transmitting data. If the adaptive frequency hopping is inactive, the Bluetooth communication device may also respond to the handshaking initiated by the collocated non-Bluetooth communication device. The handshaking may be executed via a 2-wire Bluetooth/WLAN coexistence interface or a 3-wire Bluetooth/WLAN coexistence interface.

21 Claims, 7 Drawing Sheets

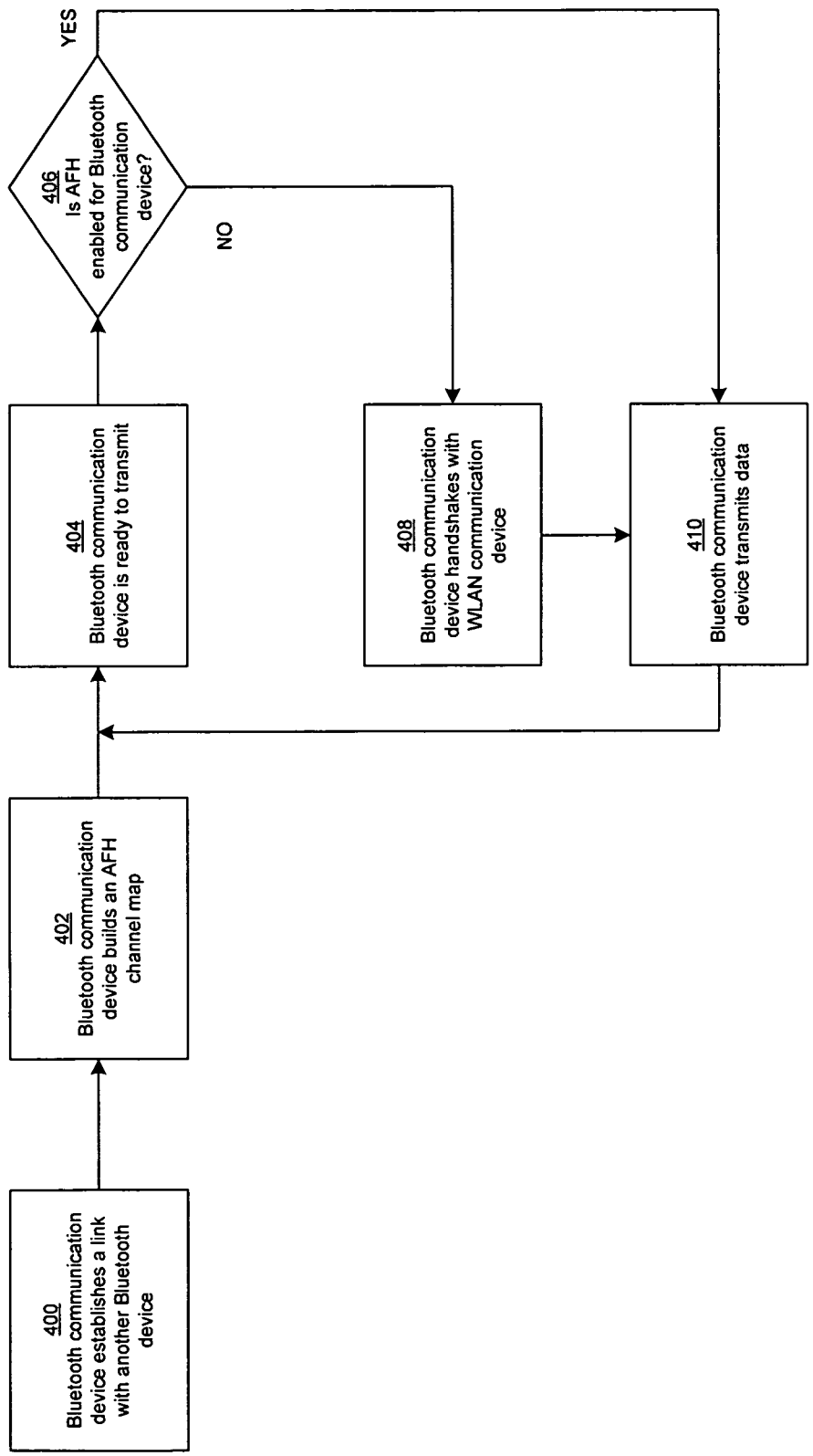

ENHANCED 2-WIRE AND 3-WIRE WLAN BLUETOOTH COEXISTENCE SOLUTION

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to enhanced 2-wire and 3-wire WLAN Bluetooth coexistence solution.

BACKGROUND OF THE INVENTION

Some conventional communication systems are known to support wireless and wireline communication between wireless and/or wireline communication devices. Such communication systems range from national and/or international cellular telephone systems to the Internet, and to point-to-point in-home wireless networks. Each type of communication system is designed, and hence operates, in accordance with relevant communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multipoint distribution systems (LMDS), multi-channel-multipoint distribution systems (MMDS), and/or variations thereof.

Depending on the type of wireless communication system, a wireless communication device, for example, a cellular telephone, two-way radio, personal digital assistant (PDA), personal computer (PC), laptop computer, or home entertainment equipment, communicates directly or indirectly with other wireless communication devices. For direct communications, also known as point-to-point communications, the participating wireless communication devices tune their receivers and transmitters to the same channel, or channels, and communicate via those channel(s). Each channel may utilize one or more of the plurality of radio frequency (RF) carriers of the wireless communication system. For indirect wireless communication, each wireless communication device communicates directly with an associated base station, for example, for cellular services, and/or an associated access point, for example, for an in-home or in-building wireless network, via an assigned channel or channels.

In order for each wireless communication device to participate in wireless communication session, it utilizes a built-in radio transceiver, which comprises a receiver and a transmitter, or it is coupled to an associated radio transceiver, for example, a station for in-home and/or in-building wireless communication networks, or a RF modem. The transmitter converts data into RF signals by modulating the data in accordance with the particular wireless communication standard. However, different communication systems may use different standards, for example, the IEEE 802.11 standard and the Bluetooth standard, which may share the same RF spectrum.

In order to alleviate signal interference from sharing an RF spectrum with other communication systems, the Bluetooth standard allows frequency hopping where information is transmitted at various frequencies. In this manner, the energy of the transmitted signal is spread across the RF spectrum in 79 channels with each channel separated by 1 MHz, between 2.402 GHz and 2.480 GHz. The Bluetooth standard allows 1600 frequency hops per second. The advantage of the frequency hopping system is that it spreads information across a wide band of frequencies. Therefore, signals transmitted by other systems using a portion of the same frequency spectrum may appear as noise to only some of the frequencies used by Bluetooth in frequency hopping. Similarly, only a portion of Bluetooth transmission may interfere with signals transmitted by other systems.

Two or more Bluetooth devices, up to a total of eight devices, may comprise a piconet with one master device and up to seven slave devices. The piconet may share a common communication data channel that presently may have a total capacity of 1 megabits per second (Mbps), up to a theoretical maximum of 3 Mbps. This data channel is divided in to time slots of 625 microseconds. Although a master device may initiate contact with any slave device, a slave device may only respond to a master device. A piconet link between a master device and a slave device may be either synchronous connectionless oriented (SCO) or asynchronous connectionless (ACL). The piconet may support up to three SCO links, and any remaining bandwidth may be utilized by ACL links.

In some current systems, a Bluetooth device may share a platform with a WLAN device. For example, a device such as a cellular telephone may have integrated thereon, a Bluetooth radio and a Wireless LAN radio. This is known as coexistence. There are times when the Bluetooth radio and the WLAN radio may need to transmit simultaneously. Since the Bluetooth radio and the WLAN radio are close to each other in distance, transmission by one radio may interfere with transmission from the other radio.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for enhanced 2-wire and 3-wire WLAN Bluetooth coexistence solution, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a flow chart illustrating exemplary steps for utilizing an enhanced coexistence solution for Bluetooth and WLAN communication devices, in accordance with an embodiment of the invention.

DETAILED DESCRIPTION OF THE INVENTION

Certain embodiments of the invention may be found in a method and system for enhanced 2-wire and 3-wire WLAN Bluetooth coexistence solution. Aspects of the method may comprise determining whether adaptive frequency hopping (AFH) is active in a Bluetooth communication device. AFH may be active for specific link or links to other Bluetooth communication devices. If AFH is active, handshaking with a collocated non-Bluetooth communication device may be disabled. The collocated non-Bluetooth communication device may be a wireless local area network communication device. The AFH may be either enabled or disabled in a specific device. However, even if the AFH is enabled, the AFH may not be active prior to establishing a Bluetooth link. Also, the AFH may not be active for non-connection states such as Inquiry, Page, or Scanning (Inquiry or Page Scan). Accordingly, an active AFH implies that the AFH is enabled, however, an enabled AFH does not necessarily indicate that the AFH is active. Similarly, an inactive AFH may indicate that the AFH is disabled or that the AFH is enabled but inactive.

In instances when AFH is not active, handshaking with the collocated non-Bluetooth communication device may be enabled, and the Bluetooth communication device may initiate handshaking prior to transmitting data. In instances when adaptive frequency hopping is inactive, the Bluetooth communication device may also respond to the handshaking initiated by the collocated non-Bluetooth communication device. The handshaking may be executed via a 2-wire Bluetooth/WLAN coexistence interface or a 3-wire Bluetooth/WLAN coexistence interface.

Figure 1:
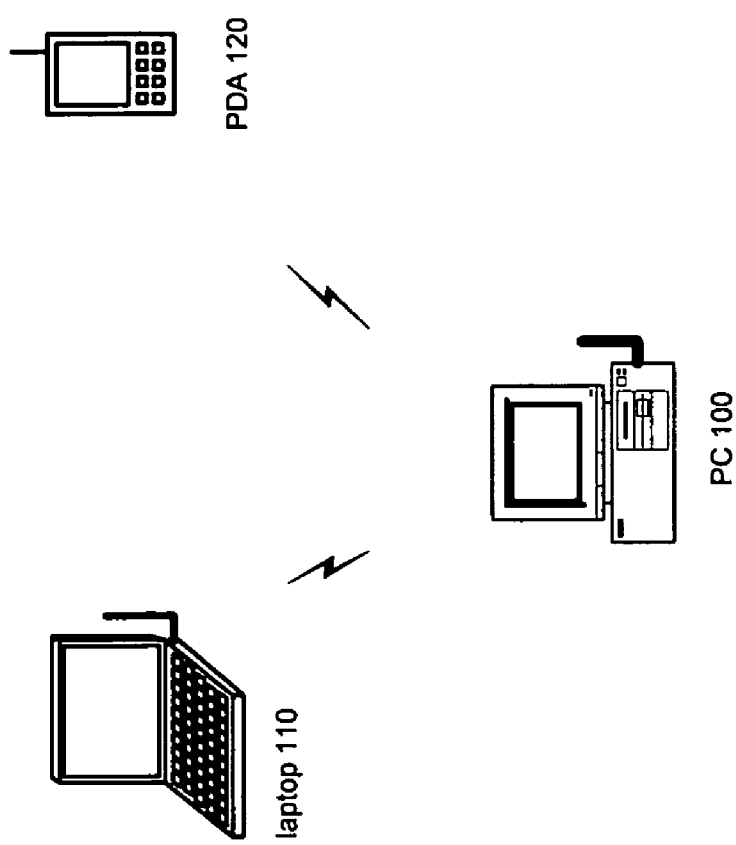
FIG. 1 illustrates a Bluetooth piconet, which may be utilized in connection with an embodiment of the invention.

FIG. 1 illustrates a Bluetooth piconet that may be utilized in connection with an embodiment of the invention. Referring to FIG. 1, there is shown a personal computer (PC) 100, a laptop 110, and a personal digital assistant (PDA) 120. These three host devices, or host platforms, may each be Bluetooth enabled. Each host device may have a Bluetooth application and a Bluetooth communication device for transmitting and receiving signals. Each host device may then be considered to be a Bluetooth device. Up to eight Bluetooth devices may communicate with each other in a local network called a piconet. In a given piconet, only one Bluetooth device may be a master, while the others may be slaves.

The process for designating a master may be a dynamic process each time a piconet is set up. A Bluetooth device may be a member of multiple piconets, where it may be designated as a master device for one piconet, and a slave device for another piconet. Each Bluetooth device may use an algorithm that takes into account different variables, for example, performance and power requirements, in deciding whether it may want to be a master device. For example, since transmitting signals to locate other Bluetooth devices to form a piconet may utilize and transmission bandwidth, a Bluetooth device may wait passively for other Bluetooth devices to try to establish a piconet. A Bluetooth device that finds other Bluetooth devices, and establishes a connection with one or more Bluetooth devices, may be designated as the master Bluetooth device for that piconet. Multiple piconets that may have connection with each other, for example, where a Bluetooth device may be a member of more than one piconet, may be referred to as a scatternet.

Although only a single piconet is illustrated, in a system comprising a plurality of piconets, it may be possible for a Bluetooth device to operate as a master device in one piconet and as a slave device in an adjacent piconet. For example, a Bluetooth device A may operate as a master device in a first piconet $P_1$ and as a slave device in a second piconet $P_2$. In another example, the Bluetooth device A may operate as a slave device in a first piconet $P_1$ and as a master device in a second piconet $P_2$. A master device, for example, the PC 100, may communicate with each of the slave devices, for example, the laptop 110 and the PDA 120. However, the slave devices may not communicate directly with each other. When the master device moves out of range of communication, the piconet may be destroyed until another Bluetooth device establishes a piconet.

Figure 2A:
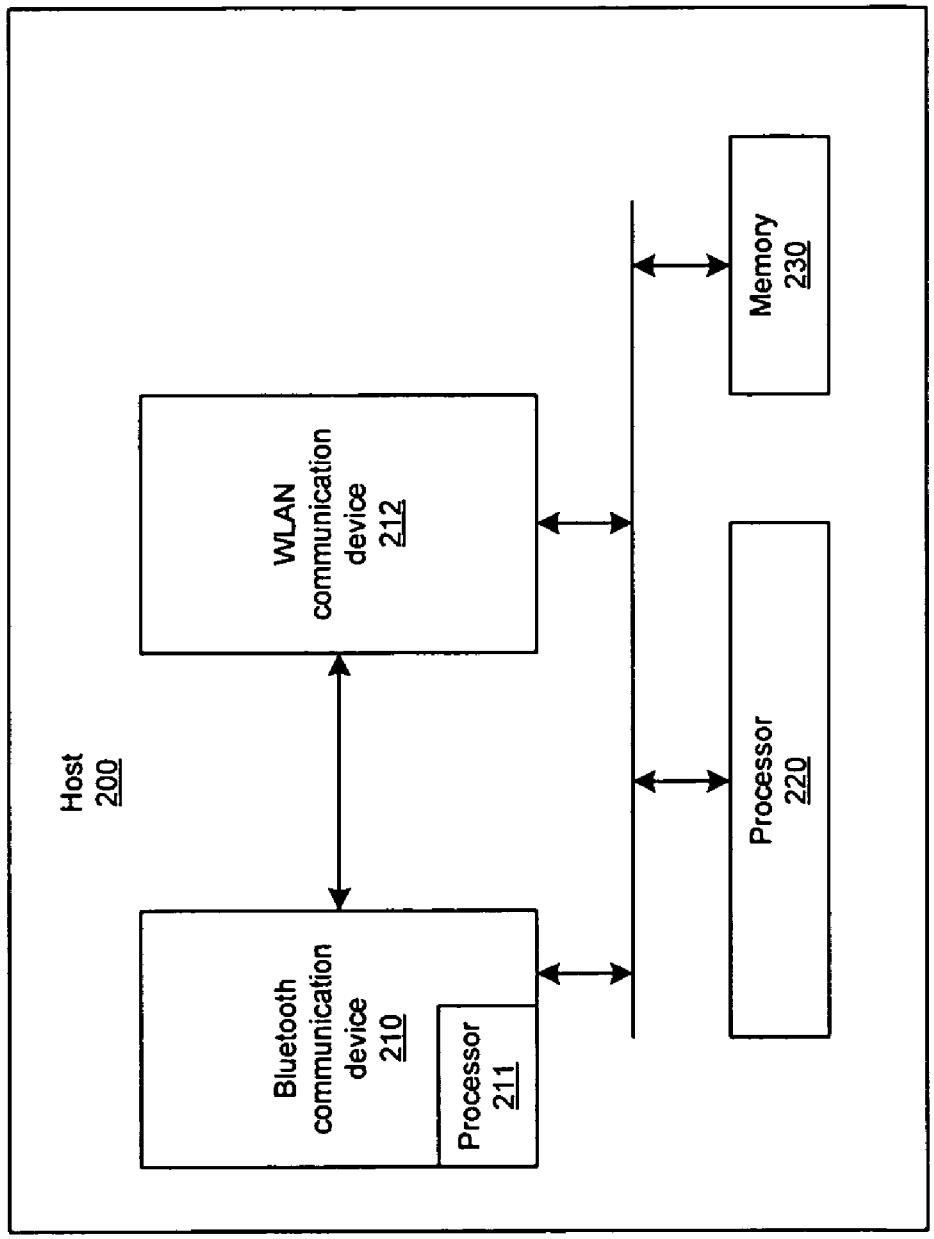
FIG. 2a is a block diagram illustrating a host device with a Bluetooth device and a WLAN device, which may be utilized in accordance with an embodiment of the invention.

FIG. 2a is a block diagram illustrating a host device with a Bluetooth device and a WLAN device, which may be utilized in accordance with an embodiment of the invention. Referring to FIG. 2, there is shown a host device 200. The host device 200 may comprise a Bluetooth communication device 210, a WLAN communication device 212, a processor 220, and memory 230. The Bluetooth communication device 210 may be a Bluetooth radio, which may comprise suitable logic, circuitry and/or code that may enable communication of data, command and/or status with other Bluetooth devices. The Bluetooth communication device 210 may comprise a processor 211. The WLAN communication device 212 may be a WLAN radio, which may comprise suitable logic, circuitry and/or code that may enable communication of data, command and/or status with other WLAN devices. The processor 220 may comprise suitable logic, circuitry and/or code that may enable communication of data, command and/or status with the Bluetooth communication device 210 and the WLAN communication device 212. The memory 230 may comprise suitable logic and/or circuitry that may enable storage of information, such as, for example, data and/or code, that may be used by other devices.

In operation, the host device 200 may be, for example, the laptop 110 that may be enabled for Bluetooth via the Bluetooth communication device 210, and connected to a LAN via the WLAN communication device 212. The processor 220 may be the main processor for the host device 200. An application that transmits via the Bluetooth communication device 210 may be a different application than the application that is accessing the LAN via the WLAN communication device 212. Accordingly, the data transmission by communication devices 210 and 212 may not be coordinated with respect to when each may transmit.

When each communication device wishes to transmit, it may assert a signal line to the other communication device. For example, a 2-wire signaling protocol or a 3-wire signaling protocol may be used between a Bluetooth communication device 210 and a WLAN communication device 212. The signaling may be accomplished by, for example, the processor 211 and/or by hardware circuitry in the Bluetooth communication device 210. The signaling may be described in more detail with respect to FIGS. 2b and 2c.

Figure 2B:
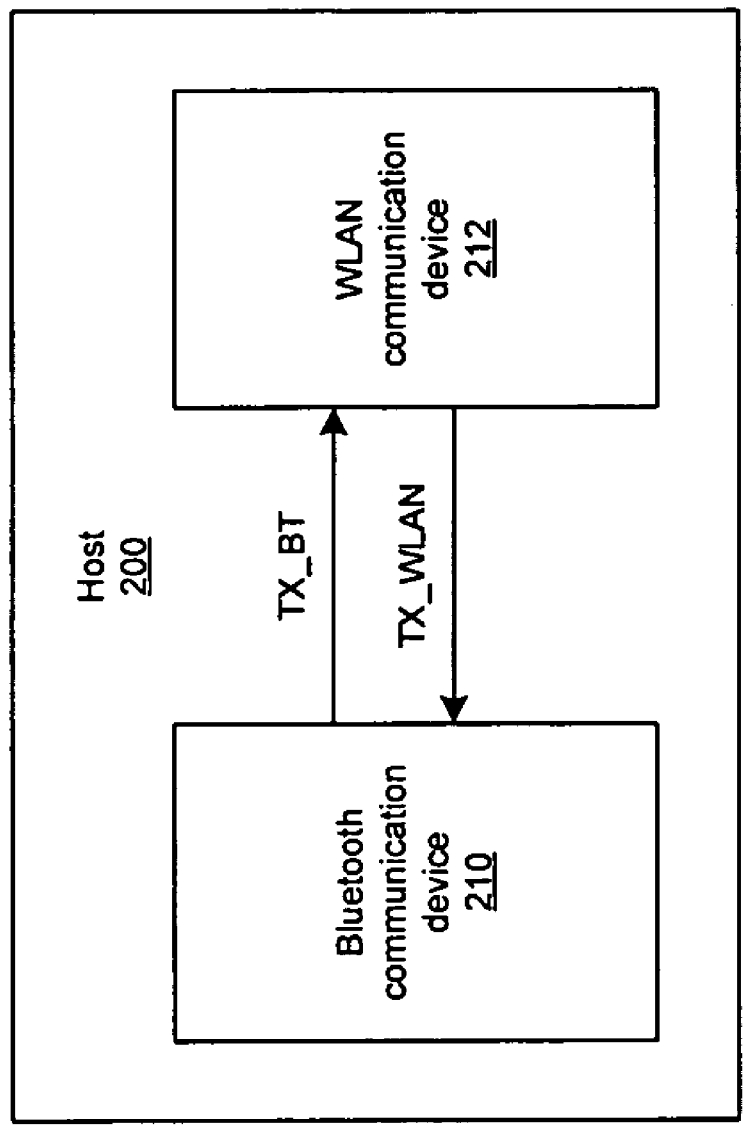
FIG. 2b is a block diagram illustrating a 2-wire Bluetooth/WLAN coexistence interface, which may be utilized in connection with an embodiment of the invention.

FIG. 2b is a block diagram illustrating a 2-wire Bluetooth/WLAN coexistence interface, which may be utilized in connection with an embodiment of the invention. Referring to FIG. 2b, there is shown the signal TX_BT and the signal TX_WLAN between the Bluetooth communication device 210 and the WLAN communication device 212. The signal TX_BT may be controlled by the Bluetooth communication device 210, and the signal TX_WLAN may be controlled by the WLAN communication device 212.

The Bluetooth communication device 210 may have high priority packets and low priority packets to transmit. High priority packets may be those that need to be delivered within a certain time. For example, voice packets may be high priority packets. Other examples of high priority packets may be the packets involved in setting up a piconet. When the Bluetooth communication device 210 has high priority packets to transmit, it may assert the signal TX_BT. Upon recognizing that the signal TX_BT has been asserted by the Bluetooth communication device 210, the WLAN communication device 212 may stop transmitting all packets, regardless of the priority of the packets.

When the WLAN communication device 212 has data to transmit, it may assert the signal TX_WLAN. If the Bluetooth communication device 210 is transmitting low priority data, it may stop transmitting the data. However, if the Bluetooth communication device 210 is transmitting high priority data, it may assert the signal TX_BT. The WLAN communication device 212 may then defer transmission of its data. Accordingly, the 2-wire coexistence interface may be used to alleviate interference that may occur when a Bluetooth communication device and a WLAN device transmits at the same time. U.S. application Ser. No. 11/143,559, filed Jun. 2, 2005, discloses a method and system for achieving enhanced quality and higher throughput for collocated IEEE 802.11b/g and Bluetooth devices in coexistent operation, and is hereby incorporated herein by reference in its entirety.

Figure 2C:
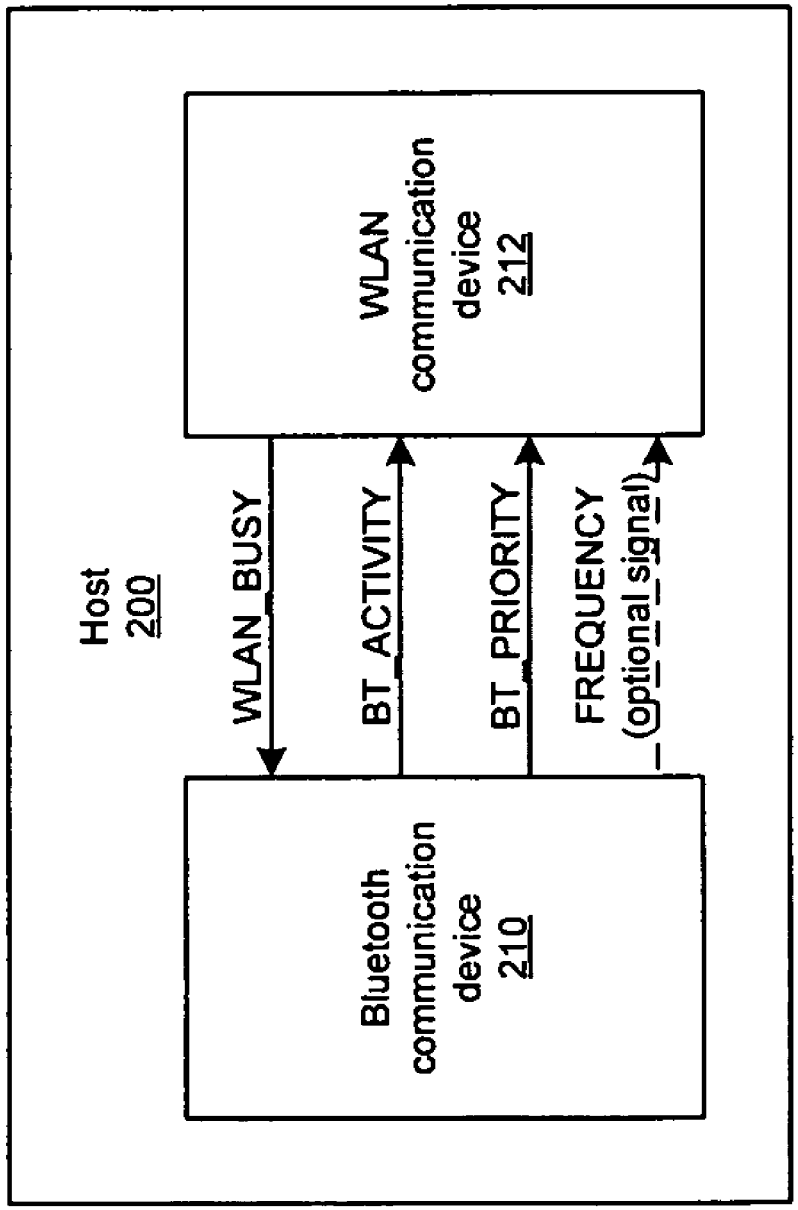
FIG. 2c is a block diagram illustrating a 3-wire Bluetooth/WLAN coexistence interface, which may be utilized in connection with an embodiment of the invention.

FIG. 2c is a block diagram illustrating a 3-wire Bluetooth/WLAN coexistence interface, which may be utilized in connection with an embodiment of the invention. Referring to FIG. 2c, there is shown the signals WLAN_BUSY, BT_ACTIVITY, BT_PRIORITY, and FREQUENCY between the Bluetooth communication device 210 and the WLAN communication device 212. The signal WLAN_BUSY may be controlled by the WLAN communication device 212 and the signal BT_ACTIVITY, BT_PRIORITY, and the signal FREQUENCY may be controlled by the Bluetooth communication device 210. The signal FREQUENCY may be an optional signal.

The signal BT_ACTIVITY may be asserted whenever there is any transmission by the Bluetooth communication device 210. The signal BT_PRIORITY may be used to signal a priority of a specific Bluetooth packet that is being transmitted by the Bluetooth communication device 210. If the signal BT_PRIORITY is not asserted, the WLAN communication device 212 may assert the signal WLAN_BUSY when it has data to transmit. Since the Bluetooth communication device 210 is transmitting low priority data, it may stop transmitting data. The optional signal FREQUENCY may be asserted by the Bluetooth communication device 210 when the next packet is going to be in the WLAN band. Accordingly, the 3-wire coexistence interface may be used to alleviate interference that may occur when a Bluetooth communication device and a WLAN device transmits at the same time.

Figure 3A:
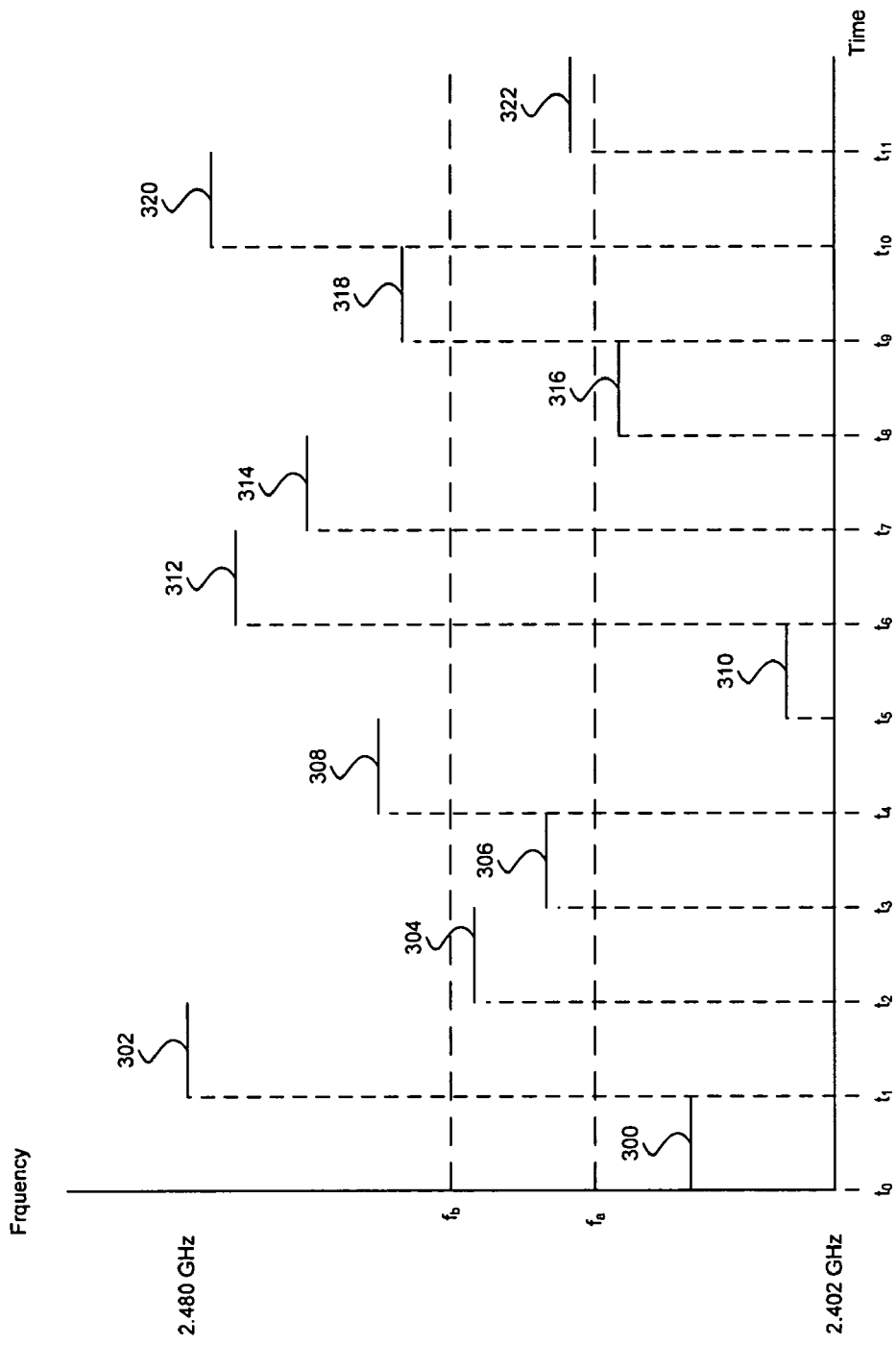
FIG. 3a is a diagram illustrating frequency hopping, in connection with an embodiment of the invention.

FIG. 3a is a graph illustrating frequency hopping, in connection with an embodiment of the invention. Referring to FIG. 3a, there is shown a graph with frequency on the vertical axis and time on the horizontal axis. There is also shown a frequency range of frequencies from 2.402 gigahertz (GHz) to 2.480 GHz, and a subset of this frequency range with frequencies from $f_a$ to $f_b$. There is also shown a plurality of Bluetooth packets 300, 302, ..., 322, transmitted at times $t_0$, $t_1$, ..., $t_{11}$. The frequency range from 2.402 GHz to 2.480 GHz may be the spectrum utilized by Bluetooth communication devices. The frequency range from $f_a$ to $f_b$ may be the spectrum utilized by, for example, the WLAN communication device 212 utilizing the IEEE 802.11 standard.

In operation, the Bluetooth communication device 210, for example, may transmit packets where each packet may be transmitted at a different frequency. This may be referred to as frequency hopping. The advantage of frequency hopping may be that the information transmitted may be spread over a wide spectrum of frequencies, and therefore, noise at any part of the spectrum may only affect a portion of the information transmitted. The noise may be any signal in the transmit frequency range that affects the transmitted information. For example, if WLAN communication device 212 transmits in the frequency range $f_a$ to $f_b$, a receiving Bluetooth device may determine that packets 304, 306 and 322 may be corrupted. The receiving Bluetooth device may request retransmission of these packets.

Figure 3B:
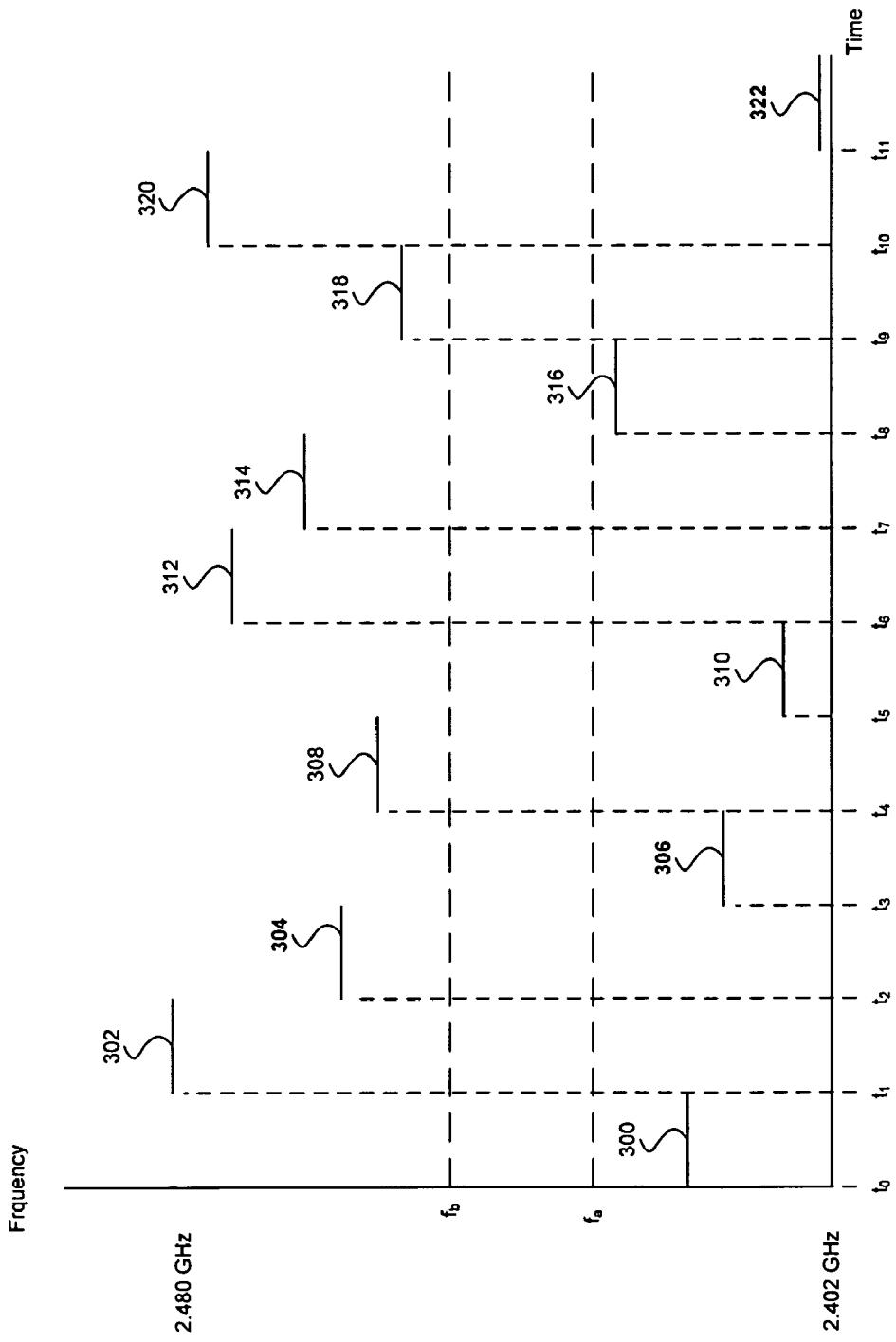
FIG. 3b is a graph illustrating adaptive frequency hopping, in connection with an embodiment of the invention.

FIG. 3b is a graph illustrating adaptive frequency hopping, in connection with an embodiment of the invention. Referring to FIG. 3b, there is shown a graph similar to the graph referred to in FIG. 3a. However, in FIG. 3b, an implementation of adaptive frequency hopping, which may be utilized by Bluetooth communication devices, may determine the frequencies at which the corrupted packets, for example, the packets 304, 306 and 322 with respect to FIG. 3a, may have been transmitted. The Bluetooth communication devices may then determine that there is interference at these frequencies, and may block use of these frequencies by mapping these frequencies to different frequencies. Accordingly, the packets 304, 306 and 322 may be transmitted at different frequencies.

However, the adaptive frequency hopping algorithm may map a transmission frequency to another frequency that may also interfere with another communication device. For example, the reassigned frequency may still be within the spectrum of frequencies from $f_a$ to $f_b$. The Bluetooth communication devices may determine that this frequency also has interference and may block it out. In this manner, frequencies that are known to interfere may be blocked by the Bluetooth communication devices. Accordingly, the Bluetooth communication device may execute handshaking with the WLAN communication device when it has data to transmit, regardless of whether the AFH is active for a link used for communication. The handshake overhead may reduce the throughput rate of both the Bluetooth communication device and the WLAN communication device.

FIG. 4 is a flow chart illustrating exemplary steps for utilizing an enhanced coexistence interface for Bluetooth and WLAN communication devices, in accordance with an embodiment of the invention. Referring to FIG. 4, in step 400, the Bluetooth communication device 210 may establish communication with other Bluetooth communication devices, such as, for example, the PC 100, the laptop 110, and/or the PDA 120. In step 402, the Bluetooth communication device 210 may generate an adaptive frequency hopping (AFH) map that may comprise information on whether frequencies within the Bluetooth spectrum are experiencing interference from other communication devices. The AFH map may mark frequencies as polluted if those frequencies are used by other communication devices, such as, for example, the WLAN communication device 212.

The AFH map may be generated by exchanging information among a Bluetooth master and Bluetooth slaves in a piconet. For example, the Bluetooth master and/or the Bluetooth slaves may have identified received frequencies that show interference. This information may be communicated to each other. Additional information may also be generated when each Bluetooth device scans the Bluetooth frequency spectrum to locate frequencies that are experiencing interference due to transmissions from other communication devices such as Bluetooth radios and WLAN radios. The Bluetooth master and the Bluetooth slaves may exchange this information for use in generating the AFH maps.

The AFH map may also comprise information sent from a Bluetooth host. For example, the host device 200 may communicate its AFH map to the Bluetooth communication device 210. The Bluetooth communication device 210 may then logical OR the AFH map from the host device 200 with the AFH map generated by the Bluetooth communication device 210. Operations other than logical OR may be utilized to generate the AFH map. The AFH map may also be received directly from a host device, for example, the host device 200. The host device 200 may have information regarding WLAN channels currently used, and may indicate to the Bluetooth communication device 210 not to use specific Bluetooth channels. The information may be transferred, for example, via a host controller interface (HCI) command Set_AFH_Channel_Classification.

In step 404, the Bluetooth communication device 210 may have data to transmit. Accordingly, the Bluetooth communication device 210 may need to determine an appropriate time to transmit the data in order to minimize interference with other transmitted signals, for example, by the WLAN communication device 212. In step 406, the Bluetooth communication device 210 may determine whether adaptive frequency hopping is active for a link being used. If the adaptive frequency hopping is active, the next step may be step 410. Otherwise, the next step may be step 408.

In step 408, the Bluetooth communication device 210 may handshake with the WLAN communication device 412 via, for example, the 2-wire or the 3-wire Bluetooth/WLAN coexistence interfaces described with respect to FIGS. 2b and 2c. In step 410, the Bluetooth communication device 210 may transmit the data. If adaptive frequency hopping is active for the link being used, the Bluetooth communication device 210 may transmit simultaneously with the WLAN communication device 212 since the frequencies used by the two communication devices for transmission may not overlap. If adaptive frequency hopping is not active for that link, then the handshaking via the signals TX_BT and TX_WLAN for the 2-wire Bluetooth/WLAN coexistence interface, or the signals WLAN_BUSY, BT_ACTIVITY, and BT_PRIORITY for the 3-wire Bluetooth/WLAN coexistence interface, for example, may determine whether the Bluetooth communication device 210 or the WLAN communication device 212 may transmit. Accordingly, there may not be interference between the two communication devices.

If the WLAN communication device 212 has data to transmit, it may initiate handshaking with the Bluetooth communication device 210 via the 2-wire or the 3-wire Bluetooth/WLAN coexistence interface shown with respect to FIGS. 2b and 2c. The Bluetooth communication device 210 may not assert any signals, such as, for example, the signal TX_BT, or the signals BT_ACTIVITY and BT_PRIORITY, if the adaptive frequency hopping is active. Accordingly, the WLAN communication device 212 may transmit the data. If the adaptive frequency hopping is not active, the Bluetooth communication device 210 may respond with handshaking via the signal TX_BT for the 2-wire Bluetooth/WLAN coexistence interface, or the signals BT_ACTIVITY and/or BT_PRIORITY for the 3-wire Bluetooth/WLAN coexistence interface, for example, to determine which communication device may transmit.

The host 200 that comprises the Bluetooth communication device 210 and the WLAN communication device 212 may be, for example, the PC 100, the laptop 110, or the PDA 120. The host 200 may also be other hardware platforms. For example, the host 200 may be an MP3 player that may utilize the WLAN communication device 212 for downloading and/or uploading MP3 files. The MP3 player may use the Bluetooth communication device 210 to transmit music from the MP3 files to a Bluetooth enabled headphone.

Another embodiment of the invention may provide a machine-readable storage, having stored thereon, a computer program having at least one code section executable by a machine, thereby causing the machine to perform the steps as described herein for enhanced 2-wire and 3-wire WLAN Bluetooth coexistence solution.

In accordance with an embodiment of the invention, aspects of an exemplary system may comprise at least one processor that enables determination of whether adaptive frequency hopping is active in a Bluetooth communication device, for example, the Bluetooth communication device 210. The processor may be, for example, the processor 211 and/or 220. If adaptive frequency hopping (AFH) is active in the Bluetooth communication device 210, a processor may disable handshaking with a collocated non-Bluetooth communication device, for example, the WLAN communication device 212. The handshaking may be via the 2-wire or 3-wire WLAN/Bluetooth coexistence solutions described with respect to FIGS. 2B and 2C.

If AFH is disabled or inactive, a processor, for example, the processor 211, may enable handshaking with the collocated non-Bluetooth communication device. For example, if AFH is disabled or inactive, the processor 211 may enable initiation of the handshaking via the signal TX_BT for the 2-wire Bluetooth/WLAN coexistence interface, or the signals BT_ACTIVITY and BT_PRIORITY for the 3-wire Bluetooth/WLAN coexistence interface, for example, by the Bluetooth communication device prior to transmitting data. If AFH is disabled or inactive, the processor 211 may also enable the Bluetooth communication device 210 to respond to the handshaking initiated by the collocated non-Bluetooth communication device. The handshaking may be via the signals TX_BT and TX_WLAN for the 2-wire Bluetooth/WLAN coexistence interface, or the signals WLAN_BUSY, BT_ACTIVITY, and BT_PRIORITY for the 3-wire Bluetooth/WLAN coexistence interface, for example, as described with respect to FIGS. 2b and 2c.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   determining whether adaptive frequency hopping is active for a Bluetooth communication link of a Bluetooth communication device;
   disabling handshaking executed via a coexistence interface between said Bluetooth communication device and a collocated non-Bluetooth communication device to allow transmission by said Bluetooth communication device simultaneously with transmission by said non-Bluetooth communication device, if said adaptive frequency hopping is active; and
   initiating handshaking by said Bluetooth communication device prior to transmission by said Bluetooth communication device, if said adaptive frequency hopping is not active.

2. The method according to claim 1, comprising, if said adaptive frequency hopping is inactive, enabling said handshaking between said Bluetooth communication device and said collocated non-Bluetooth communication device.

3. The method according to claim 1, wherein said collocated non-Bluetooth communication device is a wireless local area network communication device.

4. The method according to claim 1, wherein said adaptive frequency hopping determination is in response to said Bluetooth communication device having data ready to transmit.

5. The method according to claim 1, comprising, if said adaptive frequency hopping is inactive, responding to said handshaking initiated by said collocated non-Bluetooth communication device by said Bluetooth communication device.

6. The method according to claim 1, wherein said handshaking is executed via a 2-wire Bluetooth/WLAN coexistence interface.

7. The method according to claim 1, wherein said handshaking is executed via a 3-wire Bluetooth/WLAN coexistence interface.

8. A non-transitory machine-readable medium having stored thereon, a computer program having at least one code section for wireless communication, the at least one code section being executable by a machine for causing the machine to perform steps comprising:
   determining whether adaptive frequency hopping is active for a Bluetooth communication link of a Bluetooth communication device;
   disabling handshaking executed via a coexistence interface between said Bluetooth communication device and a collocated non-Bluetooth communication device to allow transmission by said Bluetooth communication device simultaneously with transmission by said non-Bluetooth communication device, if said adaptive frequency hopping is active; and
   initiating handshaking by said Bluetooth communication device prior to transmission by said Bluetooth communication device, if said adaptive frequency hopping is not active.

9. The non-transitory machine-readable medium according to claim 8, comprising code for, if said adaptive frequency hopping is inactive, enabling said handshaking between said Bluetooth communication device and said collocated non-Bluetooth communication device.

10. The non-transitory machine-readable medium according to claim 8, wherein said collocated non-Bluetooth communication device is a wireless local area network communication device.

11. The non-transitory machine-readable medium according to claim 8, wherein said adaptive frequency hopping determination is in response to said Bluetooth communication device having data ready to transmit.

12. The non-transitory machine-readable medium according to claim 8, comprising code for, if said adaptive frequency hopping is inactive, responding to said handshaking initiated by said collocated non-Bluetooth communication device by said Bluetooth communication device.

13. The non-transitory machine-readable medium according to claim 8, wherein said handshaking is executed via a 2-wire Bluetooth/WLAN coexistence interface.

14. The non-transitory machine-readable medium according to claim 8, wherein said handshaking is executed via a 3-wire Bluetooth/WLAN coexistence interface.

15. A system for wireless communication, the system comprising:
   at least one processor that enables determination of whether adaptive frequency hopping is active for a Bluetooth communication link of a Bluetooth communication device;
   said at least one processor enables disabling of handshaking executed via a coexistence interface between said Bluetooth communication device and a collocated non-Bluetooth communication device to allow transmission by said Bluetooth communication device simultaneously with transmission by said non-Bluetooth communication device, if said adaptive frequency hopping is active; and
   said at least one processor enables initiation of said handshaking by said Bluetooth communication device prior to transmission by said Bluetooth communication device, if said adaptive frequency hopping is not active.

16. The system according to claim 15, wherein said at least one processor enables said handshaking between said Bluetooth communication device and said collocated non-Bluetooth communication device, if said adaptive frequency hopping is inactive.

17. The system according to claim 15, wherein said collocated non-Bluetooth communication device is a wireless local area network communication device.

18. The system according to claim 15, wherein said adaptive frequency hopping determination is in response to said Bluetooth communication device having data ready to transmit.

19. The system according to claim 15, wherein said at least one processor enables responding to said handshaking initiated by said collocated non-Bluetooth communication device by said Bluetooth communication device, if said adaptive frequency hopping is inactive.

20. The system according to claim 15, wherein said handshaking is executed via a 2-wire Bluetooth/WLAN coexistence interface.

21. The method according to claim 4, wherein initiating said handshaking by said Bluetooth communication device stops transmissions by the non-Bluetooth communication device.

* * * * *